(12) United States Patent
Boyles et al.

(10) Patent No.: US 7,546,336 B2
(45) Date of Patent: Jun. 9, 2009

(54) METHOD AND SYSTEM FOR INCREASING SERVER CAPACITY

(75) Inventors: Ryan A. Boyles, Raleigh, NC (US); Paul F. McMahan, Apex, NC (US); Richard B. Southard, Clayton, NC (US)

(73) Assignee: International Business Machines Corporation, Armonk, NY (US)

( * ) Notice: Subject to any disclaimer, the term of this patent is extended or adjusted under 35 U.S.C. 154(b) by 878 days.

(21) Appl. No.: 10/906,234

(22) Filed: Feb. 10, 2005

(65) Prior Publication Data

US 2006/0179224 A1    Aug. 10, 2006

(51) Int. Cl.
    *G06F 15/173* (2006.01)
(52) U.S. Cl. .................. 709/202; 709/203; 709/223; 709/224
(58) Field of Classification Search .................. 709/202, 709/203, 223, 224
    See application file for complete search history.

(56) References Cited

U.S. PATENT DOCUMENTS

| | | | | |
|---|---|---|---|---|
| 6,029,175 | A * | 2/2000 | Chow et al. ............... | 707/104.1 |
| 6,401,134 | B1 | 6/2002 | Razavi et al. | |
| 2002/0165907 | A1 | 11/2002 | Dornquast et al. | |
| 2003/0023754 | A1 | 1/2003 | Eichstadt et al. | |
| 2003/0195950 | A1 | 10/2003 | Huang et al. | |
| 2003/0233429 | A1 * | 12/2003 | Matte et al. ............... | 709/221 |
| 2004/0162876 | A1 | 8/2004 | Kohavi | |

* cited by examiner

*Primary Examiner*—Larry D Donaghue
*Assistant Examiner*—Adnan M Mirza
(74) *Attorney, Agent, or Firm*—Charles L. Moore; Frederick D. Bailey; Moore & Van Allen, PLLC

(57) ABSTRACT

A method for increasing server capacity may include causing a program to run in a browser in response to a session on a server. The program may be adapted to spawn a new browser window in response to a web page associated with the session being unloaded. The method may also include destroying all data associated with the session in response to a signal from the spawned browser window. The method may further include returning memory occupied by the data associated with the session to a memory pool.

3 Claims, 5 Drawing Sheets

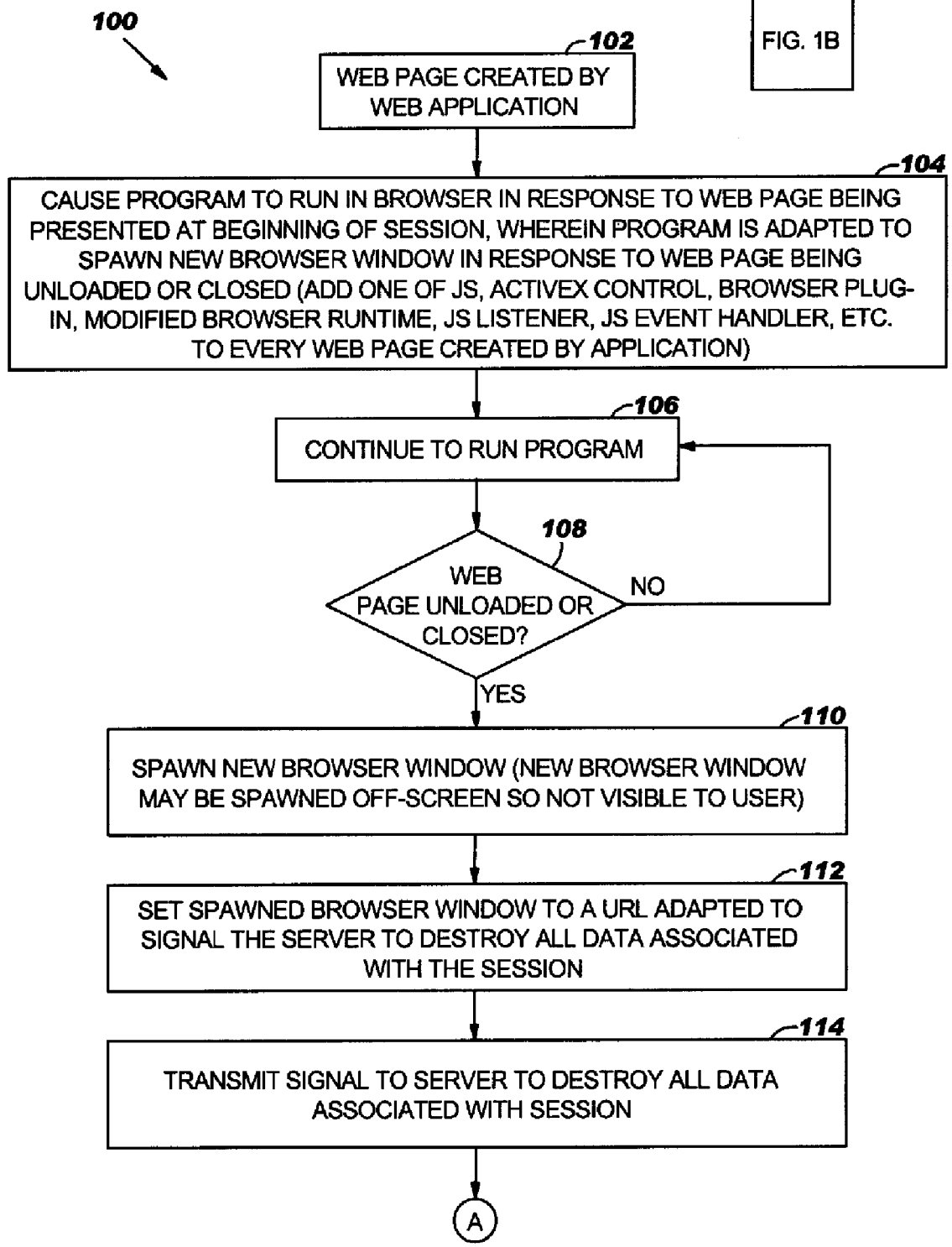

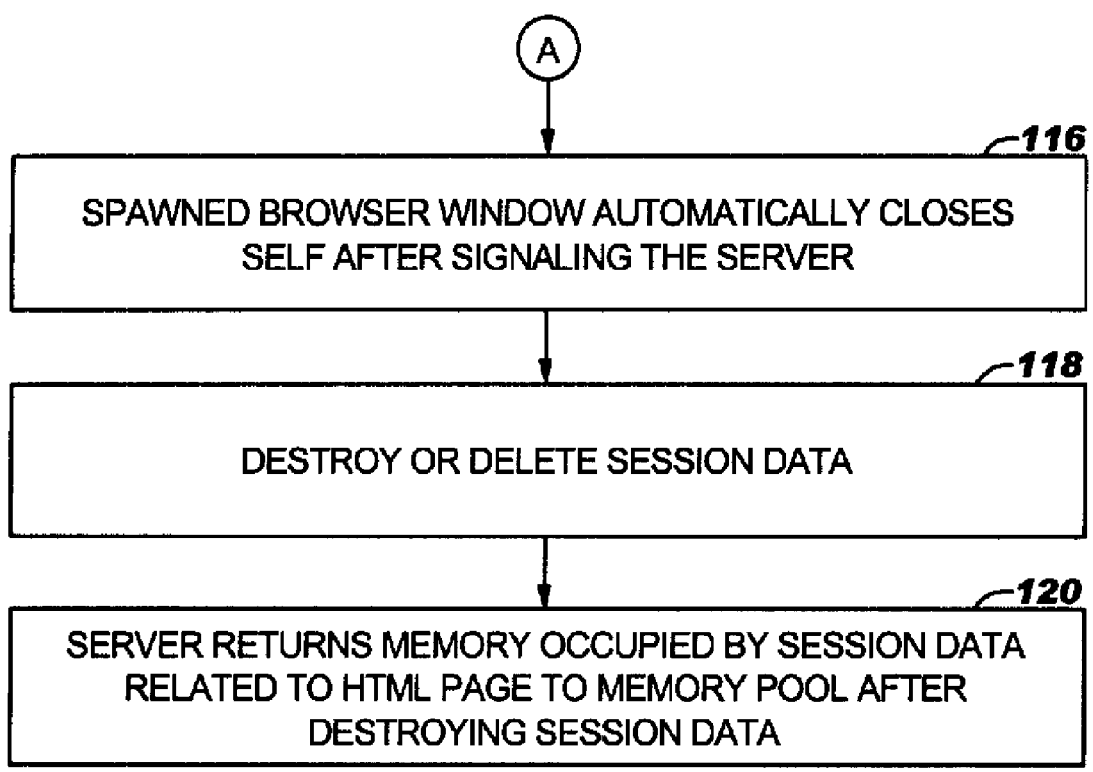

# METHOD AND SYSTEM FOR INCREASING SERVER CAPACITY

BACKGROUND OF INVENTION

The present invention relates to computer systems and software and more particularly to a method and system for increasing server capacity via expedited session invalidation.

In web-based applications, a user interface may be displayed in a web browser but the data used to generate the hypertext makeup language (HTML) page is maintained on the web server. Because hypertext transfer protocol (HTTP) is a connectionless protocol, the web server is unaware when the user has closed the browser window. Anticipating that the user may initiate another request, the web server will keep the user's data associated with a session in memory even though the data may no longer be useful if the user has closed his browser window or accessed another web site. Maintaining this data in memory decreases the amount of memory available to other users of the web server and may result in a memory leak or loss of data associated with other active users.

One technique of minimizing the possibility of a memory leak or loss of data is to destroy the session data associated with a user when the last access time exceeds some predetermined time interval. Some web application servers may store user-specific application data in a session object. The session object maintains a record of the last access time by the user. If the last access time by the user exceeds some predetermined time interval, for example thirty minutes, a background thread on the web application server destroys the session object and returns the memory to a memory pool for use by other users. However, the memory is not immediately returned to the pool when no longer needed. Additionally, there may be times when the user does not interact with the application within the predetermined time interval but may still desire to keep the session established.

A "logout" button may also be provided in a web interface that will allow a user to explicitly signal the application server when the session in no longer needed. However, users may not understand the purpose of the button or may forget to click-on or operate the button before closing the browser or accessing another web site.

Additionally, if the session data is not destroyed or deleted when no longer needed, an unauthorized user may access the private session data. This type of attack may be carried out on a shared or unattended workstation when a user closes the main application window but does not close all browser windows. A sibling browser window that has remained open still retains the session key and can access the private session data. If another (unauthorized) user gains access to the sibling browser window before the session may timeout, the other user may gain access to all of the previous user's session data.

BRIEF SUMMARY OF INVENTION

In accordance with an embodiment of the present invention, a method for increasing server capacity may include causing a program to run in a browser in response to a session on a server. The program may be adapted to spawn a new browser window in response to a web page associated with the session being unloaded. The method may also include destroying or deleting all data associated with the session in response to a signal from the spawned browser window. The method may further include returning memory occupied by the data associated with the session to a memory pool after destroying all data associated with the session.

In accordance with another embodiment of the present invention, a system for increasing server capacity may include a data structure to cause a program to run in a browser in response to a session on a server. The program may be adapted to spawn a new browser window in response to a web page associated with the session being unloaded. The system may also include a data structure to cause all data associated with the session to be destroyed or deleted in response to a signal from the spawned browser window. The system may further include a data structure to return memory occupied by the data associated with the session to a memory pool after destroying all data associated with the session.

In accordance with another embodiment of the present invention, a computer program product for increasing server capacity may include a computer readable medium having computer readable program code embodied therein. The computer readable medium may include computer readable program code configured to cause a program to run in a browser in response to a session on a server. The program may be adapted to spawn a new browser window in response to a web page associated with the session being unloaded. The computer readable medium may also include computer readable program code configured to cause all data associated with the session to be destroyed or deleted in response to a signal from the spawned browser window. The computer readable medium may further include computer readable program code configured to return memory occupied by the data associated with the session to a memory pool after the data associated with the session has been destroyed.

BRIEF DESCRIPTION OF THE SEVERAL VIEWS OF THE DRAWINGS

FIGS. 1A and 1B (collectively FIG. 1) are a flow chart of an example of a method for increasing server capacity in accordance with an embodiment of the present invention.

DETAILED DESCRIPTION OF THE INVENTION

Figure 2A:
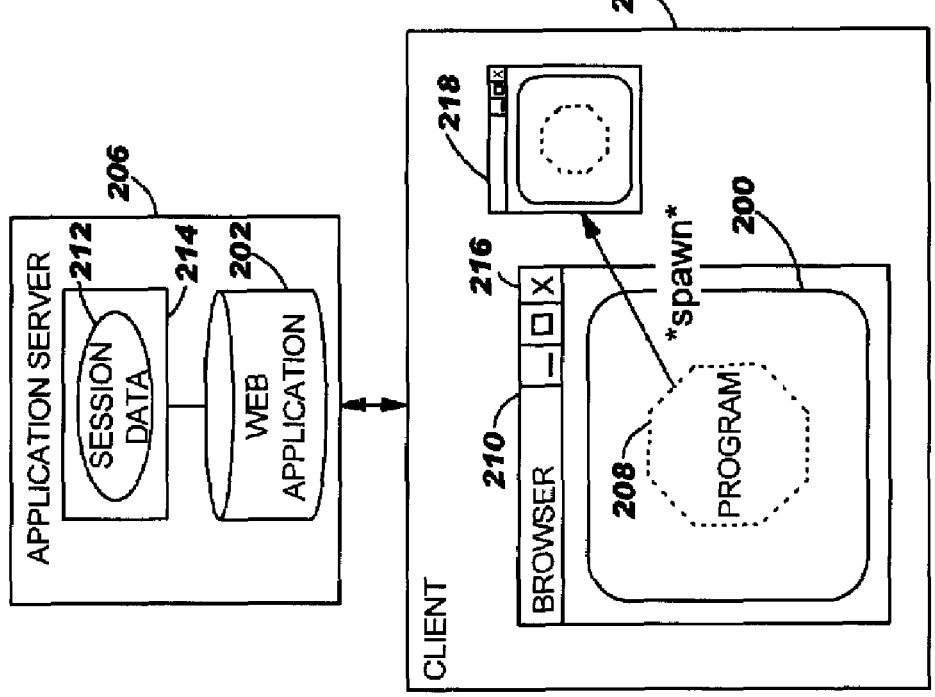
FIGS. 2A-2D illustrate an example of a sequence of operations for increasing server capacity in accordance with an embodiment of the present invention.

The following detailed description of embodiments refers to the accompanying drawings, which illustrate specific embodiments of the invention. Other embodiments having different structures and operations do not depart from the scope of the present invention.

As will be appreciated by one of skill in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present invention may be written in an object oriented programming language such as Java7, Smalltalk or C++ or the like. However, the computer program code for carrying out operations of the present invention may also be written in conventional procedural programming languages, such as the "C" programming language or a similar programming language. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

Referring to FIG. 1 and FIGS. 2A-2D, FIG. 1 is a flow chart of an example of a method 100 for increasing server capacity in accordance with an embodiment of the present invention. FIGS. 2A-2D illustrate an example of a sequence of operations for increasing server capacity in accordance with the embodiment of the present invention of FIG. 1. In block 102, a web page 200 (FIG. 2A), hypertext markup language (HTML) page or the like may be created by a web application 202 (FIG. 2A) and presented on a display of a client system or device 204. The web application 202 may reside or be maintained on a web server or application server 206. The web application 202 may be defined by a web site, universal resource locator (URL), Internet address (IP address) or similar identifying address on a network, such as the Internet, intranet, private network or similar network. The client 204 may be any type of device with a browser capability, such as a personal computer (PC), personal digital assistant (PDA) or a communications device, such as a cellular telephone or the like with Internet access.

In block 104, a program 208 (FIG. 2A) may be run in a browser 210 operable on the client 204. The program 208 may be run in response to the web application 202 being accessed or the web page 200 being presented at the beginning of a session utilizing the web application 202. The web page 200 may cause the program 208 to be run. A session may be defined as the time period during which a user or client interacts with a web application, web site or the like. During this period of interaction, session data 212 or data associated with the session may be collected and maintained for the duration of the session in a data source or memory 214 associated with the web or application server 206 as illustrated in FIG. 2A. Examples of the session data 212 that may be collected and maintained may include data related to web pages viewed or accessed, information entered by the user, requests entered by the user or similar data generated as a result of interaction by a user or client 204.

The program 208 (FIG. 2A) caused to run in block 104 may be adapted to spawn a new browser window in response to a web page associated with the session being unloaded or closed as described in more detail herein. In an embodiment of the present invention, the program 208 may be a JavaScript® (JS) listener or JS event handler or the like that may be added to or associated with every web page created by the web application 202 during the session. The JS listener or JS event handler may spawn a new browser window in response to detecting a web page associated with the session being unloaded or closed. JavaScript® is a trademark of Sun Microsystems, Inc. in the United States, other countries, or both. In other embodiments, the program 208 may be an ActiveX® control, browser plug-in, modified browser runtime or the like. These programs may be utilized or added to or associated with each web page during the session to spawn a new browser window in response to detecting when the associated web page is unloaded. ActiveX® is a trademark of Microsoft Corporation in the United States, other countries or both.

In block 106 (FIG. 1), the program 208 (FIG. 2A) may continue to run as long as a web page associated with the session is not unloaded or closed or the session has not timed out from inactivity after a predetermined time period, for example, thirty minutes. In block 108, a determination may be made if a web page associated with the session has been unloaded or closed. The web page may be closed or unloaded by a user "clicking-on" or otherwise activating a close symbol or icon in the browser window using a computer pointing device, mouse or the like. The web page may also be unloaded by the user entering another URL or IP address in the browser address bar or block and going to that other URL or IP address.

Figure 2B:
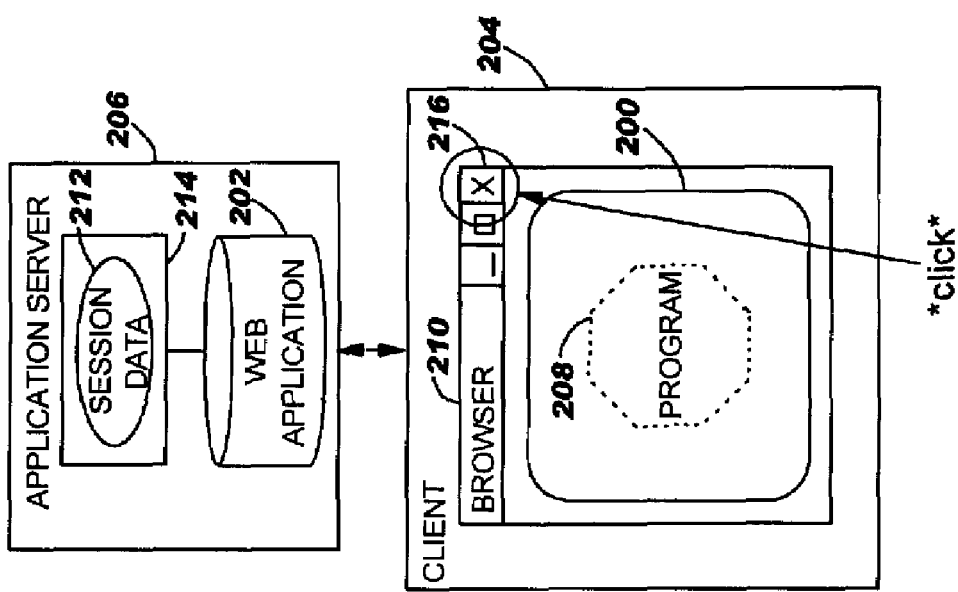

If web page 200 has not been unloaded or closed, the method 100 may return to block 106 and the program 208 may continue to run. If a web page associated with the session has been unloaded or closed, the method 100 may advance to block 110. In block 110, a new browser window may be spawned in response to unloading or closing a web page associated with the session. FIG. 2A illustrates clicking-on a close symbol or icon 216 in the browser 210. FIG. 2B illustrates the program 208 spawning a new browser window 218 in response to operation of the close symbol 216 and unloading of the web page 200. The new browser window 218 may be spawned off-screen so that the window 218 is not visible to the user in the user's monitor or display. In this manner, the window 218 may be spawned outside of the user's control. The spawned window 218 may have intelligence built in to know when the browser 210 has actually closed versus just unloaded another page pursuant to interactions by the user.

Figure 2D:
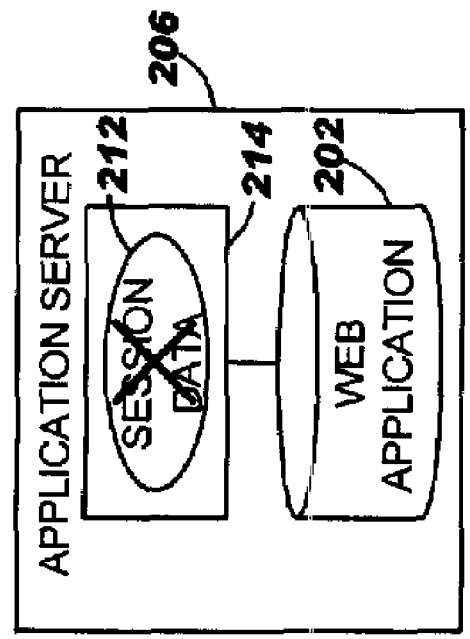
Figure 2C:
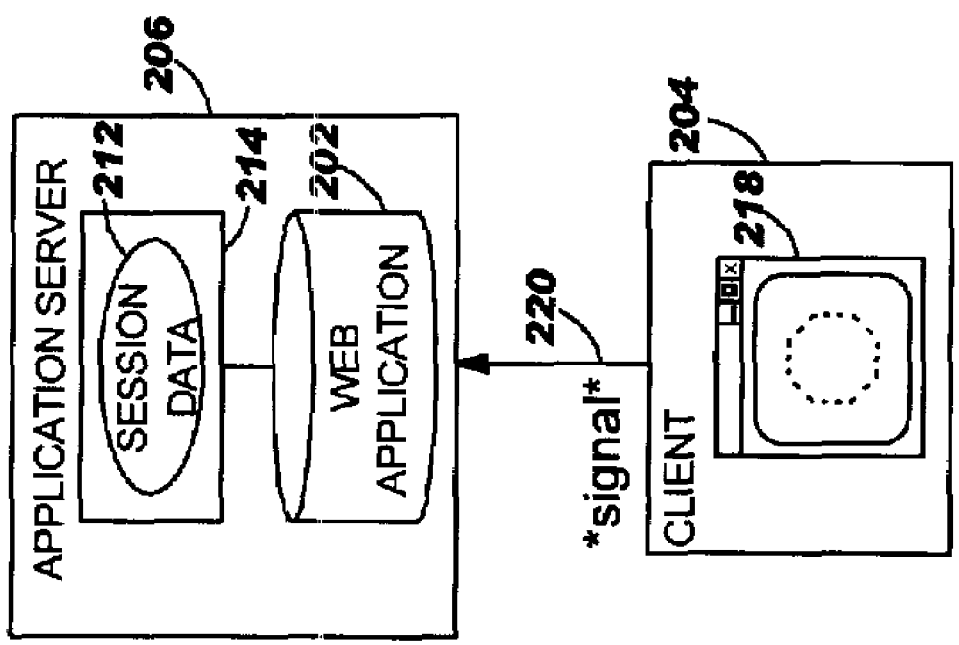

In block 112, the spawned browser window 218 (FIG. 2B) may be set to a URL or otherwise adapted to signal the server 204 to destroy or delete all session data 212 associated with the session. In block 114, a signal 220 (FIG. 2C) may be transmitted by the spawned browser window 218 to the application server 206 as illustrated in FIG. 2C. The signal 220 may be transmitted after the web page 200 has unloaded or the browser 210 closed.

In block 116 (FIG. 1), the spawned browser window 218 may automatically close itself after signaling the server 206. In block 118, the data associated with the session 212 may be destroyed or deleted as illustrated in FIG. 2D. In block 120, the memory occupied by the session data 212 may be returned to the memory pool 214 by the server 206 after destroying or deleting the session data 212.

Figure 3:
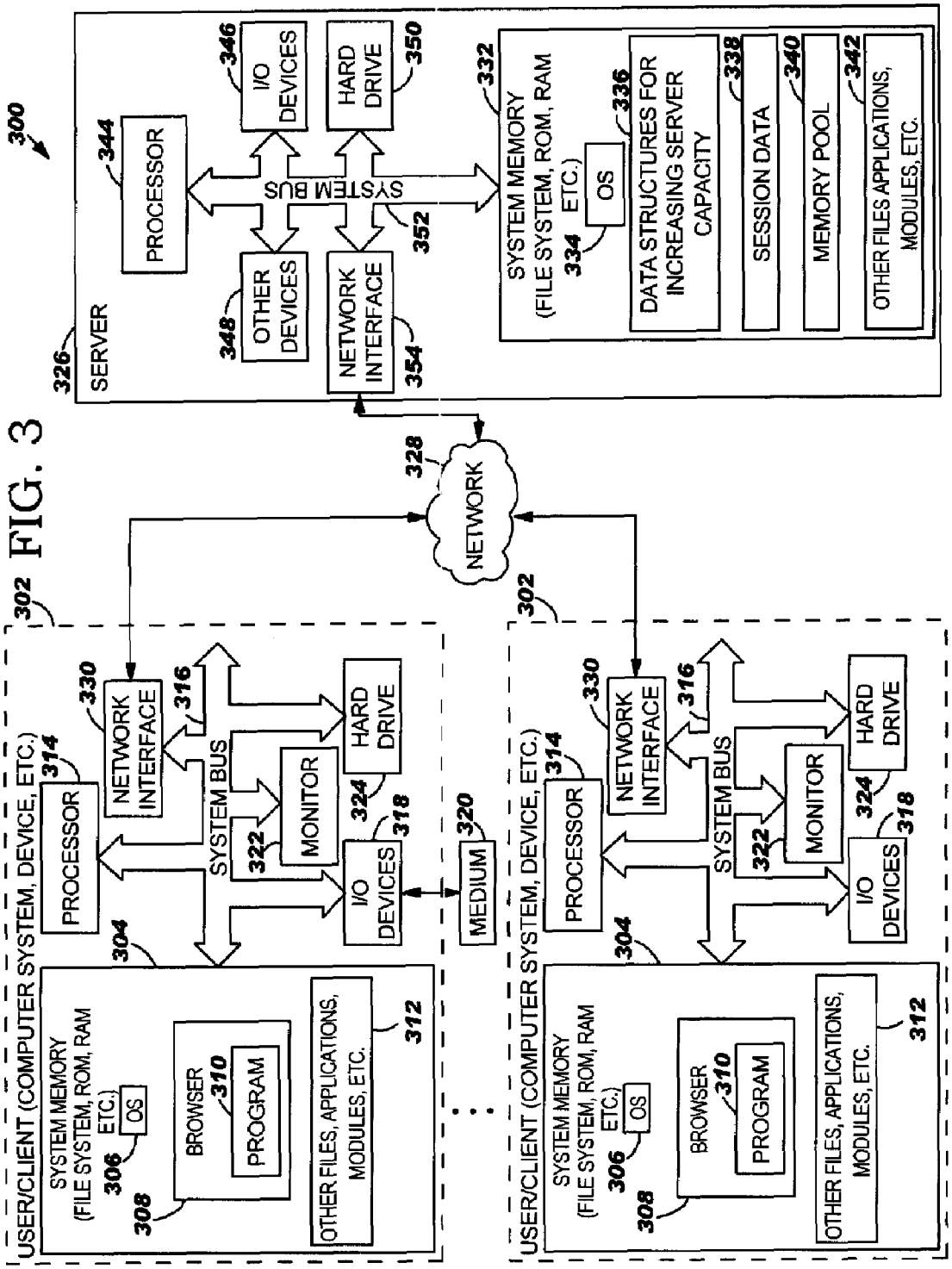
FIG. 3 is an exemplary system for increasing server capacity in accordance with an embodiment of the present invention.

FIG. 3 is an exemplary system 300 for increasing server capacity in accordance with an embodiment of the present invention. The method 100 of FIG. 1 may be embodied in and performed by the system 300. The system 300 may include or may be accessed by one or more user or client computer systems or devices 302. The client systems or devices 302 may be similar to the client 204 in FIGS. 2A-2D. As previously described, the client system or device 302 may be any type of device with a browser capability or web access capability, such as a personal computer, PDA, or any type of communication device with such a capability.

The client system or device 302 may include a system memory or local file system 304. The system memory 304 may include a read only memory (ROM) and a random access memory (RAM). The ROM may include a basic input/output system (BIOS). The BIOS may contain basic routines that help to transfer information between elements or components of the computer system 302. The RAM or system memory 304 may contain an operating system 306 to control overall operation of the computer system 302. The RAM may also include a browser 308 or web browser. As previously discussed, in accordance with an embodiment of the present invention, a program 310 may be caused to run on the browser 308 in response to initiating a session with a web application or the like or opening a web page associated with a web application. The program 310 may be adapted to spawn a new browser window similar to that discussed with respect to method 100 of FIG. 1 and FIGS. 2A-2D. The RAM may further include other application programs 312, other program modules, data, files and the like for other purposes or functions.

The computer system or device 302 may also include a processor or processing unit 314 to control operations of the other components of the computer system 302. The operating system 306, browser 308, and other program modules 312 may be operable on the processor 314. The processor 314 may be coupled to the memory system 304 and other components of the computer system 302 by a system bus 316.

The computer system 302 may also include multiple input devices, output devices or combination input/output devices 318. Each input/output device 318 may be coupled to the system bus 316 by an input/output interface (not shown in FIG. 3). The input and output devices or combination I/O devices 318 permit a user to operate and interface with the computer system 302 and to control operation of the browser 308 to access web applications and the like. The I/O devices 318 may include a keyboard and computer pointing device or the like to perform the operations discussed herein, such as the click events.

The I/O devices 318 may also include disk drives, optical, mechanical, magnetic, or infrared input/output devices, modems or the like. The I/O devices 318 may be used to access a medium 320. The medium 320 may contain, store, communicate or transport computer-readable or computer-executable instructions or other information for use by or in connection with a system, such as the computer systems 302.

The computer system 302 or device may also include or be connected other devices, such as a display or monitor 322. The monitor 322 may be used to permit the user to interface with the computer system 302.

The computer system 302 may also include a hard disk drive 324. The hard drive 324 may be coupled to the system bus 316 by a hard drive interface (not shown in FIG. 3). The hard drive 324 may also form part of the local file system or system memory 304. Programs, software and data may be transferred and exchanged between the system memory 304 and the hard drive 324 for operation of the computer system 302.

The computer systems 302 may communicate with a remote server or web server 326 and may access other servers or other computer systems (not shown) similar to computer system 302 via a network 328. The system bus 316 may be coupled to the network 328 by a network interface 330. The network interface 330 may be a modem, Ethernet card, router, gateway or the like for coupling to the network 328. The coupling may be a wired connection or wireless. The network 328 may be the Internet, private network, an intranet or the like.

The server 326 may also include a system memory 332 that may include a file system, ROM, RAM and the like. The system memory 332 may include an operating system 334 similar to operating system 306 in computer systems 302. The system memory 332 may also include data structures 336 for increasing server capacity or the like. The data structures 336 may include operations or may cause operations to be performed similar to those described with respect to method 100 in FIG. 1. The server system memory 332 may also store session data 338 or data associated with a session similar to session data 212 described with respect to FIGS. 2A-2D. The server system memory 332 may also include a memory pool 340. The memory pool 340 may be an allocation of memory in the memory system 332 that may be used to store session data for the duration of a user's session on the server 326. The server system memory 332 may further include other files 342, applications, modules and the like for other purposes or to perform other operations.

The server 326 may also include a processor 344 or a processing unit to control operation of other devices in the server 326. The server 326 may also include I/O device 346. The I/O devices 346 may be similar to I/O devices 318 of computer systems 302. The server 326 may further include other devices 348, such as a monitor or the like to provide an interface along with the I/O devices 346 to the server 326. The server 326 may also include a hard disk drive 350. A system bus 352 may connect the different components of the server 326. A network interface 354 may couple the server 326 to the network 328 via the system bus 352.

The flowcharts and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems which perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Although specific embodiments have been illustrated and described herein, those of ordinary skill in the art appreciate that any arrangement which is calculated to achieve the same purpose may be substituted for the specific embodiments shown and that the invention has other applications in other environments. This application is intended to cover any adaptations or variations of the present invention. The following claims are in no way intended to limit the scope of the invention to the specific embodiments described herein.

What is claimed is:

1. A method for increasing server capacity, comprising:
   causing a program to run in a browser on a client in response to a session on a server, wherein the program is adapted to spawn a new browser window in response to a webpage associated with the session being unloaded;
   causing the spawned browser window to be spawned off-screen and outside of a user's control;
   setting the spawned browser window to signal the server to destroy all data associated with the session;
   transmitting the signal to the server to destroy all data associated with the session in response to the webpage being unloaded or the browser closed;
   causing the spawned browser window to automatically close itself after signaling the server;
   destroying all data associated with the session in response to the signal from the spawned browser window; and
   returning memory occupied by the data associated with the session to a memory pool after destroying all data associated with the session.

2. A system for increasing server capacity, comprising:
   a client computer system;
   a data structure to cause a program to run in a browser on the client computer system in response to a session on a server, wherein the program is adapted to spawn a new browser window in response to a webpage associated with the session being unloaded;
   a data structure to cause the spawned browser window to be spawned off-screen and outside of a user's control;
   a data structure to set the spawned browser window to a URL adapted to signal the server to destroy all data associated with the session;
   a data structure to transmit the signal to the server to destroy all data associated with the session in response to the webpage being unloaded or the browser closed;
   a data structure to cause the spawned browser window to automatically close itself after signaling the server;
   a data structure to cause all data associated with the session to be destroyed in response to a signal from the spawned browser window; and
   a data structure to return memory occupied by the data associated with the session to a memory pool after destroying all data associated with the session.

3. A computer program product for increasing server capacity, the computer program product comprising:
   a computer readable storage medium having computer readable program code embodied therein, the computer readable storage medium comprising:
   computer readable program code configured to cause a program to run in a browser in response to a session on a server, wherein the program is adapted to spawn a new browser window in response to a webpage associated with the session being unloaded;
   computer readable program code configured to cause the spawned browser window to be spawned off-screen and outside of a user's control;
   computer readable program code configured to set the spawned browser window to a URL adapted to signal the server to destroy all data associated with the session;
   computer readable program code configured to transmit the signal to the server to destroy all data associated with the session in response to the webpage being unloaded or the browser closed;
   computer readable program code configured to cause the spawned browser window to automatically close itself after signaling the server;
   computer readable program code configured to cause all data associated with the session to be destroyed in response to a signal from the spawned browser window; and
   computer readable program code configured to return memory occupied by the data associated with the session to a memory pool after the data associated with the session has been destroyed.

* * * * *